United States Patent
Shimizu

(10) Patent No.: US 9,778,645 B2
(45) Date of Patent: Oct. 3, 2017

(54) NUMERICAL CONTROLLER PROVIDED WITH FUNCTION OF CORRECTING DISPLACEMENT ERROR CAUSED BY WORK

(71) Applicant: FANUC Corporation, Minamitsuru-gun, Yamanashi (JP)

(72) Inventor: Tsuyuki Shimizu, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 391 days.

(21) Appl. No.: 14/571,787

(22) Filed: Dec. 16, 2014

(65) Prior Publication Data

US 2015/0177727 A1    Jun. 25, 2015

(30) Foreign Application Priority Data

Dec. 19, 2013  (JP) .................................. 2013-262995

(51) Int. Cl.
*G05B 19/19* (2006.01)
*G05B 19/404* (2006.01)

(52) U.S. Cl.
CPC .......... *G05B 19/19* (2013.01); *G05B 19/404* (2013.01); *G05B 2219/37241* (2013.01); *G05B 2219/49087* (2013.01)

(58) Field of Classification Search
CPC .................. G05B 19/19; G05B 19/404; G05B 2219/37241; G05B 2219/49087
See application file for complete search history.

(56) References Cited

U.S. PATENT DOCUMENTS

| 5,220,510 A | 6/1993 | Araki |
| 6,065,338 A | 5/2000 | Stoiber et al. |
| 8,350,514 B2 * | 1/2013 | Otsuki ................. G05B 19/404 318/568.15 |
| 2009/0140684 A1 | 6/2009 | Otsuki et al. |

(Continued)

FOREIGN PATENT DOCUMENTS

| CN | 1207183 A | 2/1999 |
| JP | H03-287343 A | 12/1991 |

(Continued)

OTHER PUBLICATIONS

The Notification of First Office Action issued Nov. 1, 2016 in Chinese Patent Application No. 2014107987546 (6 pages) with an English Translation (8 pages).

(Continued)

*Primary Examiner* — Abdelmoniem Elamin
(74) *Attorney, Agent, or Firm* — Drinker Biddle & Reath LLP

(57) ABSTRACT

A numerical controller uses a work lattice region setting unit and a rotation axis work lattice region setting unit to form lattice points for error correction and uses a work-caused translation correction amount setting unit to set a correction amount of a work-caused translation error. A work-caused translation correction amount calculation unit calculates a correction amount at a tool center point position, and a correction section of the numerical controller adds the work-caused translation correction amount to positions of three commanded linear axes for error correction.

3 Claims, 17 Drawing Sheets

(56) References Cited

U.S. PATENT DOCUMENTS

| | | | | |
|---|---|---|---|---|
| 2012/0001583 A1* | 1/2012 | Otsuki | ................ | G05B 19/404 |
| | | | | 318/632 |
| 2012/0323373 A1* | 12/2012 | Sato | .................... | G05B 19/404 |
| | | | | 700/275 |
| 2015/0094847 A1* | 4/2015 | Liu | .................... | G05B 19/404 |
| | | | | 700/174 |

FOREIGN PATENT DOCUMENTS

| JP | H05-004150 A | 1/1993 |
|---|---|---|
| JP | H10-020912 A | 1/1998 |
| JP | 2002-515832 A | 5/2002 |
| JP | 2009-151756 A | 7/2009 |
| JP | 4327894 B2 | 9/2009 |

OTHER PUBLICATIONS

Decision to Grant a Patent issued Jul. 14, 2015 in Japanese Patent Application No. 2013-262995 (3 pages) with an English Translation (4 pages).

* cited by examiner

FIG. 7

LATTICE POINT NUMBERS OF WORK LATTICE REGION

|  |  | ROTATION AXIS B (ANGLE) | | |
|---|---|---|---|---|
|  |  | 0 | 45.0 | 90.0 |
| ROTATION AXIS C (ANGLE) | 0 | P1-P12 (FIG. 5) | P13-P24 (FIG. 6) | P25-P36 |
|  | 45.0 | P37-P48 | P49-P60 | P61-P72 |
|  | 90.0 | P73-P84 | P85-P96 | P97-P108 |

FIG. 12

| LATTICE POINT NUMBER P | ROTATION AXIS | | LINEAR AXIS (WORK LATTICE REGION REFERENCE COORDINATE SYSTEM) | | | WORK-CAUSED TRANSLATION CORRECTION AMOUNT $\Delta C_w$ |
|---|---|---|---|---|---|---|
| | B | C | X | Y | Z | |
| 1 | 0 | 0 | 0 | 0 | 0 | $\Delta X_w(1), \Delta Y_w(1), \Delta Z_w(1)$ |
| 2 | 0 | 0 | 10.0 | 0 | 0 | $\Delta X_w(2), \Delta Y_w(2), \Delta Z_w(2)$ |
| .. | .. | .. | .. | .. | .. | .. |
| 12 | 0 | 0 | 30.0 | 30.0 | 0 | $\Delta X_w(12), \Delta Y_w(12), \Delta Z_w(12)$ |
| 13 | 45.0 | 0 | 0 | 0 | 15.0 | $\Delta X_w(13), \Delta Y_w(13), \Delta Z_w(13)$ |
| .. | .. | .. | .. | .. | .. | .. |
| n | B(n) | C(n) | X(n) | Y(n) | Z(n) | $\Delta X_w(n), \Delta Y_w(n), \Delta Z_w(n)$ |

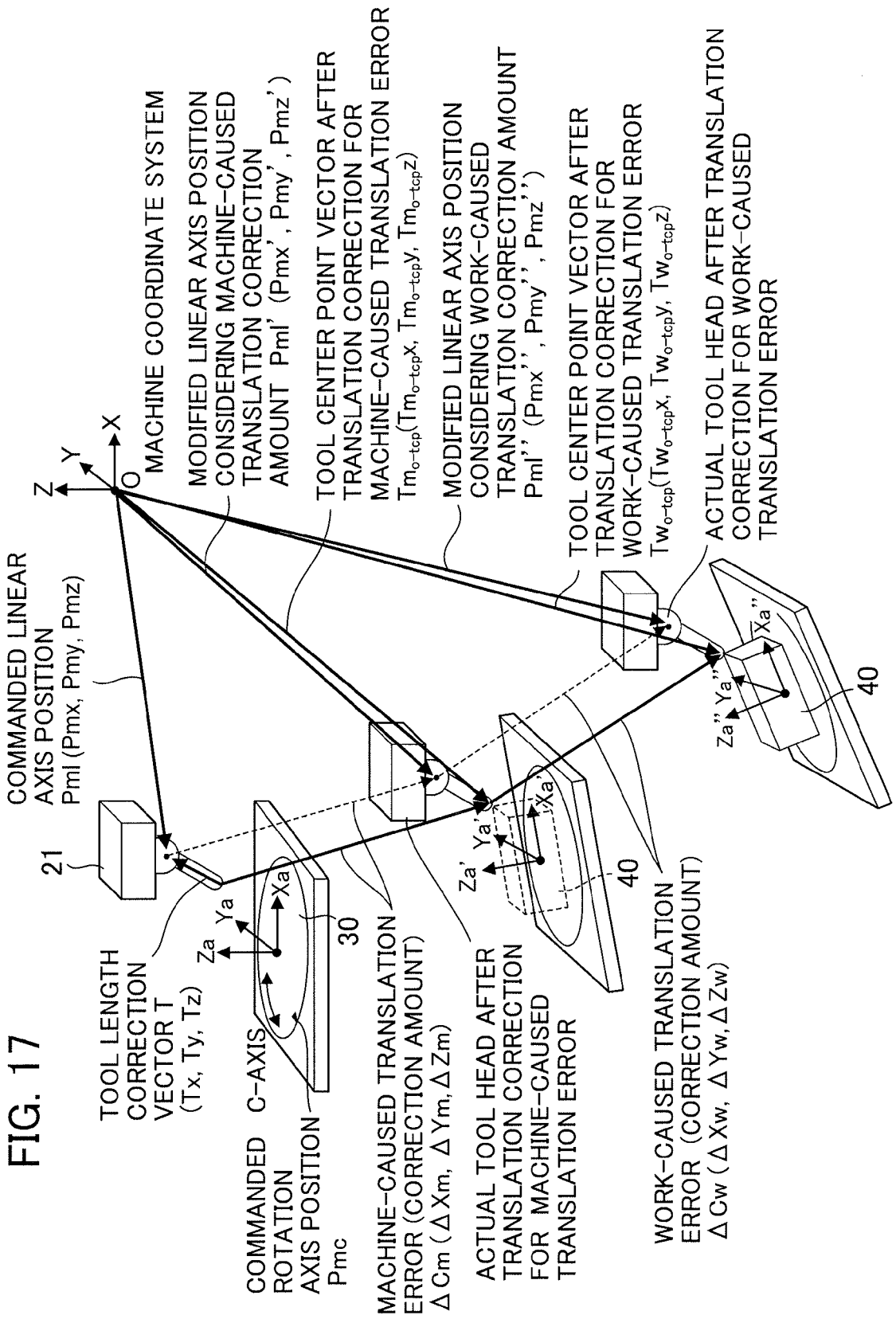

US 9,778,645 B2

NUMERICAL CONTROLLER PROVIDED WITH FUNCTION OF CORRECTING DISPLACEMENT ERROR CAUSED BY WORK

RELATED APPLICATION DATA

This application claims priority under 35 U.S.C. §119 and/or §365 to Japanese Application No. 2013-262995 filed Dec. 19, 2013, the entire contents is incorporated herein by reference.

BACKGROUND OF THE INVENTION

Field of the Invention

The present invention relates to a numerical controller for controlling a five-axis machine tool with three linear axes and two rotation axes and, more particularly, to a numerical controller for performing control to achieve highly accurate machining by setting an error amount changing according to a work type as translation error correction amounts corresponding to positions of coordinates specified in a work to move a tool center point position to an accurate position.

Description of the Related Art

JP 2009-151756 A discloses a numerical controller that divides each of a linear axis coordinate system and a rotation axis coordinate system into lattice regions, stores a lattice point correction vector for each lattice point, calculates, based on the lattice point correction vector, an axis-dependent translation correction amount and an axis-dependent rotation correction amount from a linear axis position and a rotation axis position, to correct the linear axis position.

The numerical controller disclosed in JP 2009-151756 A can correct a positional error of a tool center point by a previously measured error caused due to a mechanical system. However, an error newly generated when the mechanical system is influenced by a change of a work to be machined or an error generated due to a shape change of a work to be machined can not be taken into account.

SUMMARY OF THE INVENTION

To cope with those above, in the present invention, correction amounts at measurable lattice points within a work lattice region covering the work are set, a translation correction amount for a tool center point is calculated from the correction amounts, and the calculated translation correction amount is added to a commanded linear axis position, whereby the present invention provides a numerical controller for controlling a five-axis machine tool which is capable of moving the tool center point position to an accurate position for high precision machining. That is, an object of the present invention is to provide a numerical controller capable of enabling the five-axis machine tool to perform machining at an instructed tool center point position even after replacement of the work.

According to the present invention, there is provided a numerical controller for controlling a five-axis machine tool that applies machining to a work placed on a table with three linear axes and two rotation axes, wherein an error amount changing according to a work type is set as translation correction amounts corresponding to positions of coordinates specified in the work. With this configuration, the linear three axes can be driven so as to move the tool center point position to an accurate position on the work.

According to the present invention, there is provided a numerical controller for controlling a five-axis machine tool that applies machining to a work placed on a table with three linear axes and two rotation axes, the numerical controller including: a work lattice region setting unit configured to set a work lattice region within a work neighboring region covering the work in a three-dimensional coordinate system fixed on the table, the work lattice region being divided in a lattice at lattice points arranged at predetermined intervals; a rotation axis work lattice region setting unit configured to set rotation positions of two rotation axes of the table in the work lattice region; a work-caused translation correction amount setting unit configured to set correction amounts of a work-caused translation error with respect to the lattice points of the rotation axis work lattice region; and a work-caused translation correction amount calculation unit configured to calculate, from the set correction amounts, a correction amount for a tool center point position on the work, and a correction section of the numerical controller configured to add the work-caused translation correction amount to positions of three commanded linear axes for error correction.

The five-axis machine tool may be a rotary table type five-axis machine tool configured to rotate the table about two axes.

The five-axis machine tool is a mixed type five-axis machine tool configured to rotate a tool head and table about two axes, respectively.

In the present invention, not only the machine-caused error, but also the work-caused error is considered and, thus, there can be provided a numerical controller provided with a function of correcting a displacement error caused by a work, which is capable of improving work machining quality.

BRIEF DESCRIPTION OF THE DRAWINGS

The above and other objects and features of the present invention will be more apparent from the following description taken in conjunction with the accompanying drawings in which:

FIG. 7 is a table illustrating lattice point numbers set for the work lattice region;

FIG. 12 is a view explaining that data of measured work-caused translation correction amount $\Delta Cw$ is stored in a non-volatile memory or the like incorporated in the numerical controller in the form of a correction amount table;

FIG. 17 is a view illustrating a relationship between the tool and table in the absence of an error, a relationship between the tool and table in the presence of the machine-caused translation error, and a relationship between the work and table in the presence of the work-caused translation error which is caused due to installation of the work on the table.

DETAILED DESCRIPTION OF THE PREFERRED EMBODIMENTS

First Embodiment

<1> Target Machine and Error Correction Vector

Figure 1:
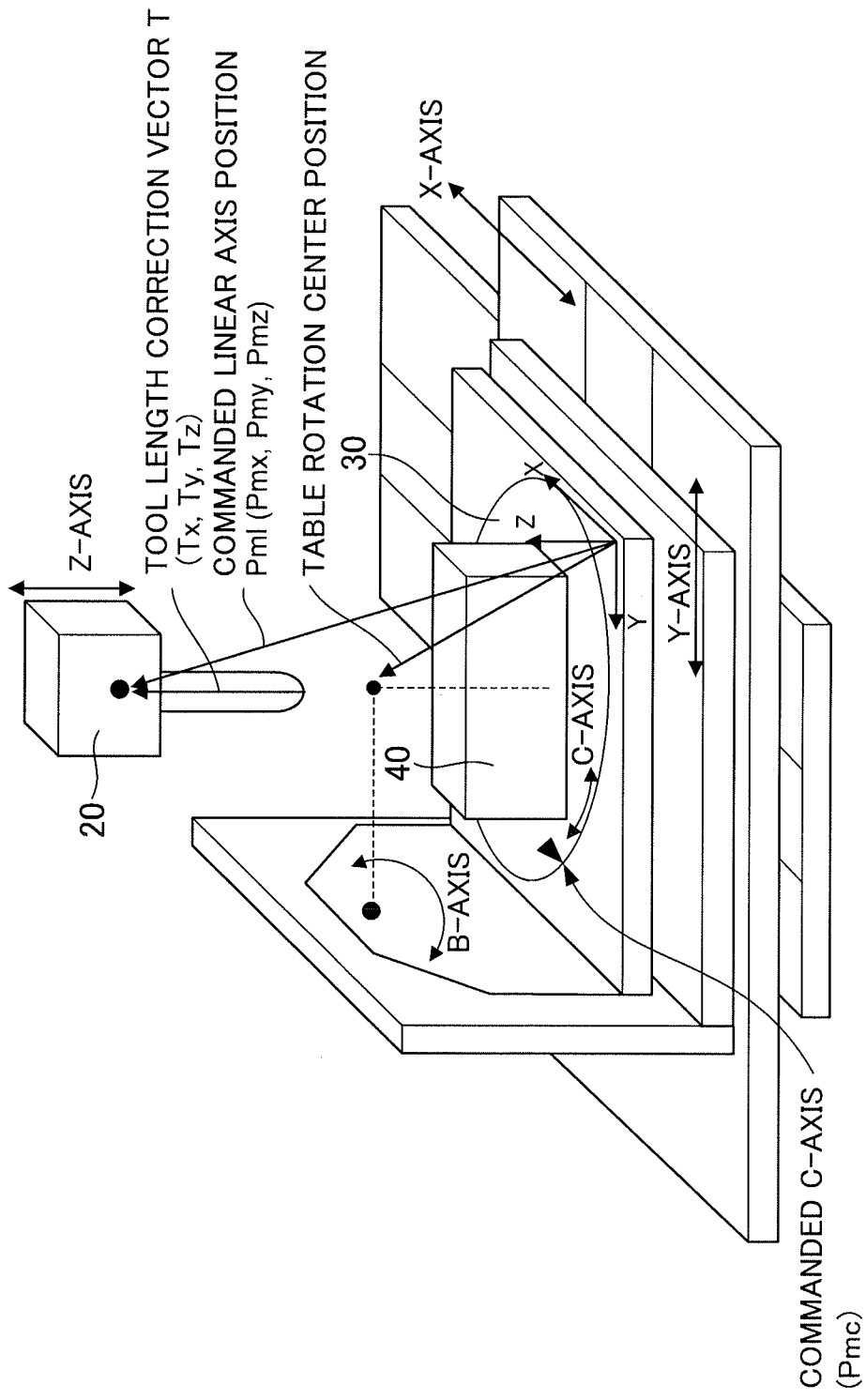
FIG. 1 an example of a rotary table of a five-axis machine tool that operates under control of a numerical controller in an embodiment of the present invention.

FIG. 1 is an embodiment of a rotary table of a five-axis machine tool that operates under control of a numerical controller. In a mechanical configuration illustrated in FIG. 1, a table 30 rotating about a C-axis and tilting about a B-axis is placed on a Y-axis. The Y-axis linearly moves on an X-axis, and a tool head 20 linearly moves along a Z-axis in a vertical direction. A work 40 is placed on the table 30.

A translation error caused by a machine side, a translation error caused by a work side, and correction thereof in the rotary table five-axis machine tool will be described. The translation error caused by the machine is referred to as a machine-caused translation error, and translation error caused by the work is referred to as a work-caused translation error.

Figure 2:
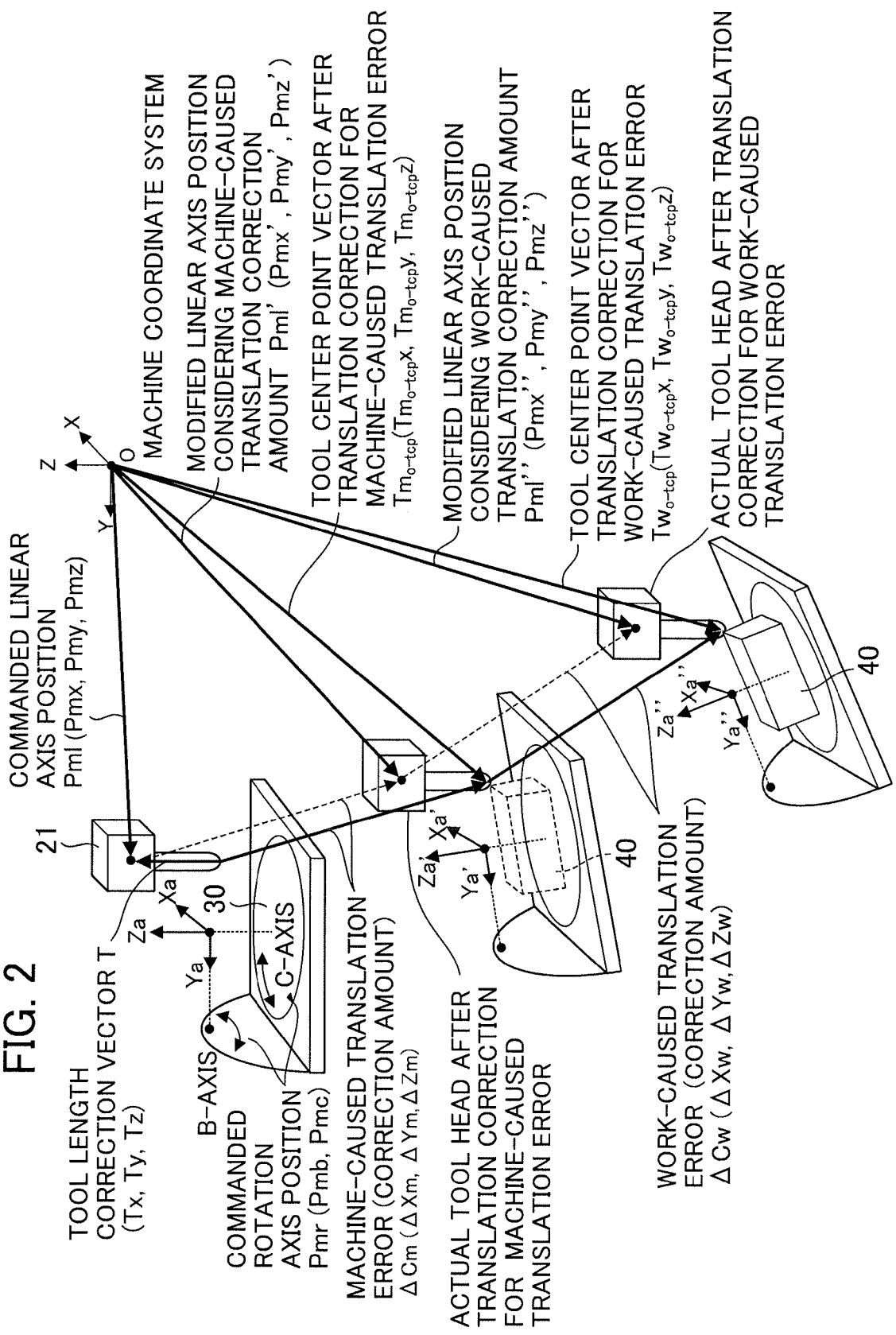
FIG. 2 is a view illustrating a relationship between a tool and a table in the absence of an error, a relationship between the tool and table in the presence of a machine-caused translation error, and a relationship between a work and table in the presence of a work-caused translation error which is caused due to installation of the work on the table.

FIG. 2 is a view illustrating a relationship between a tool 21 and table 30 in the absence of an error, a relationship between the tool 21 and table 30 in the presence of the machine-caused translation error, and a relationship between a work 40 and table 30 in the presence of the work-caused translation error which is caused due to installation of the work 40 on the table 30. In this example, when a table coordinate system is represented by (Xa, Ya, Za) coordinates defining a table rotation center as an origin, the table coordinate system in the presence of the machine-caused translation error which is caused by the machine is represented by (Xa', Ya', Za') coordinates, and the table coordinate system in the presence of the work-caused translation error which is caused due to installation of the work on the table is represented by (Xa", Ya", Za") coordinates.

The machine-caused translation error is an error in a translation direction generated by a positional relationship between a linear axis and a rotation axis, i.e., a mechanical positional relationship. The machine-caused translation error ($\Delta Xm$, $\Delta Ym$, $\Delta Zm$) in FIG. 2 represents errors in X-, Y-, and Z-axis directions between (Xa, Ya, Za) coordinates and (Xa', Ya', Za'). These errors are small in amount, but are exaggerated for ease of understanding. Error correction for the machine-caused translation error is described in detail in JP 2009-151756 and the like, so descriptions thereof are omitted here.

The work-caused translation error is an error in the translation direction caused by the work 40 when the work 40 is installed on the table 30. A work-caused translation error ($\Delta Xw$, $\Delta Yw$, $\Delta Zw$) in FIG. 2 which is an error amount from an original position at a contact point between the work 40 and tool center point represents translation errors in X-, Y-, and Z-axis directions between (Xa', Ya', Za') coordinates and (Xa", Ya", Za"). These errors are also small in amount, but are exaggerated for ease of understanding.

Correction amounts of the machine-caused translation error and work-caused translation error based on a commanded linear axis position Pml (Pmx, Pmy, Pmz) and a commanded rotation axis position Pmr (Pmb, Pmc) are assumed to be $\Delta Cm$ ($\Delta Xm$, $\Delta Ym$, $\Delta Zm$) and $\Delta Cw$ ($\Delta Xw$, $\Delta Yw$, $\Delta Zw$), respectively. Since error amounts on the table 30 side and work 40 side are correction targets, they can be regarded also as correction amounts. Assuming that a tool center point vector after translation correction for the machine-caused translation error is $Tm_{o\text{-}tcp}$ ($Tm_{o\text{-}tcp}x$, $Tm_{o\text{-}tcp}y$, $Tm_{o\text{-}tcp}z$), and a tool center point vector after translation correction for the work-caused translation error is $Tw_{o\text{-}tcp}$ ($Tw_{o\text{-}tcp}x$, $Tw_{o\text{-}tcp}y$, $Tw_{o\text{-}tcp}z$), $\Delta Cw$ ($\Delta Xw$, $\Delta Yw$, $\Delta Zw$) can be represented by the following expression (1):

$$\Delta Cw = \begin{bmatrix} \Delta Xw^x \\ \Delta Yw^y \\ \Delta Zw^z \end{bmatrix} = \begin{bmatrix} Tw^x_{o\text{-}tcp} - Tm^x_{o\text{-}tcp} \\ Tw^y_{o\text{-}tcp} - Tm^y_{o\text{-}tcp} \\ Tw^z_{o\text{-}tcp} - Tm^z_{o\text{-}tcp} \end{bmatrix} \quad (1)$$

The thus calculated work-caused translation correction amount $\Delta Cw$ ($\Delta Xw$, $\Delta Yw$, $\Delta Zw$) is added to a modified linear axis position Pml' (Pmx', Pmy', Pmz') considering the machine-caused translation correction amount to calculate a modified linear axis position Pml" (Pmx", Pmy", Pmz"). The linear X-, Y- and Z-axes are driven to attain the modified linear axis position Pml" (Pmx", Pmy", Pmz"), and the rotary B- and C-axes are driven to attain the commanded position, whereby the tool center point position as viewed from the table can be moved to a position free from the work-caused error as well as the already corrected machine-caused error.

<2> Work-Caused Error

The error caused by the work 40 to be machined, i.e., a displacement error by the work is an error generated in a machining region due to replacement of the work 40 with another work 40 having a different weight and a size and inclination of a surface of the table 30 caused by the replacement or an error generated when the table 30 is inclined upon positioning of the rotation axis and, accordingly, the work 40 acts on a rotation center axis of the table 30.

<3> Definition Method for Work Lattice Region

Figure 3:
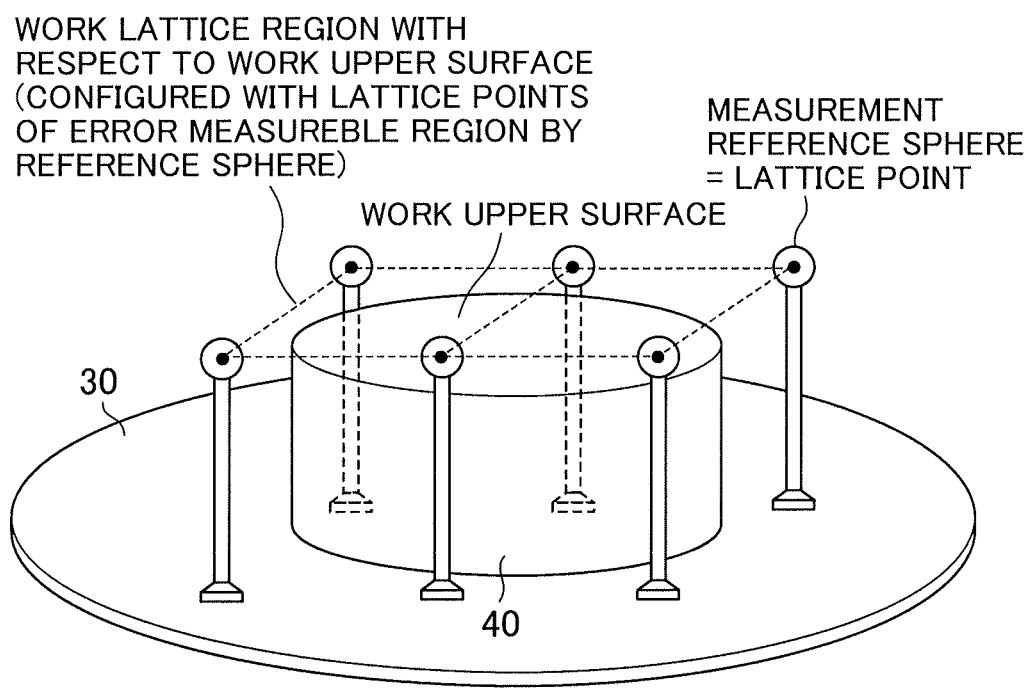
FIG. 3 is a view illustrating a state where a range covering an upper surface of the work is divided in a lattice at points each of which a measurement reference sphere can be installed.
Figure 4:
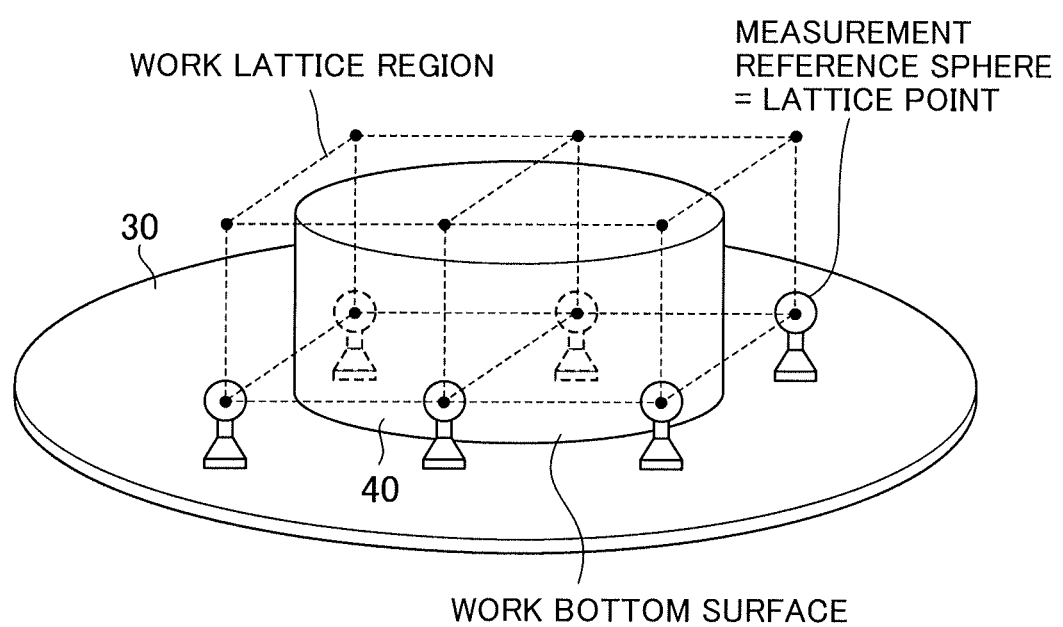
FIG. 4 is a view illustrating a work lattice region formed by a three-dimensional coordinate system obtained by connecting lattice points, each of which a measurement reference sphere can be installed, at which a range covering an area around a bottom surface of the work is divided in a lattice and lattice points of the work upper surface.

FIG. 3 illustrates a state where a range covering an upper surface of the work is divided in a lattice at points each of which a measurement reference sphere can be installed. A center position of the reference sphere corresponds to a lattice point. FIG. 4 illustrates a work lattice region formed by a three-dimensional coordinate system obtained by connecting lattice points, each of which a measurement reference sphere can be installed, at which a range covering an area around a bottom surface of the work is divided in a lattice and lattice points of the work upper surface. In this case, a shape of the work is not limited to a columnar shape as illustrated in FIG. 3 but may be a rectangular parallelepiped shape, a truncated pyramid shape, or a spherical shape. The number of the lattice points increases/decreases depending on the installation positions of the measurement reference spheres.

Figure 5:
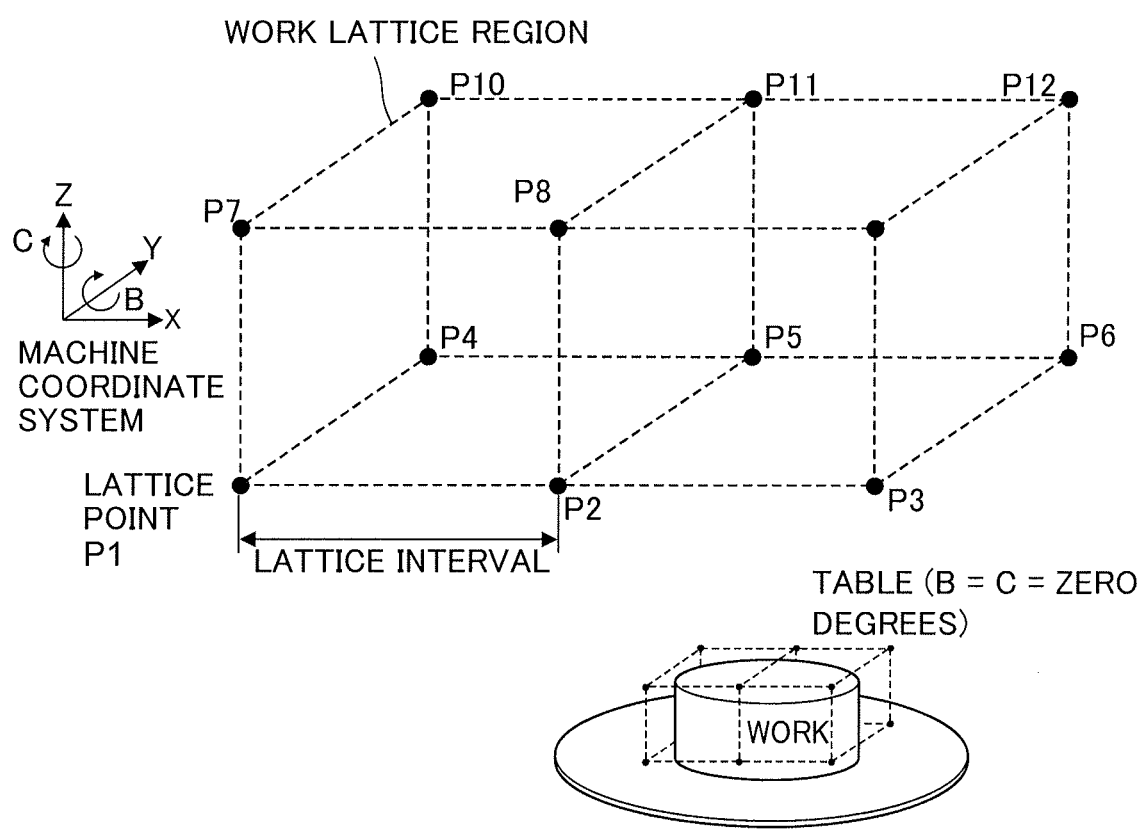
FIG. 5 is a view illustrating the work lattice region of FIG. 4.

FIG. 5 illustrates the work lattice region of FIG. 4. Symbols P1 to P12 denote lattice points at which lattice division lines cross one another. The lattice intervals do not have to be constant. The above operations are performed by a work lattice region setting unit 8.

Figure 6:
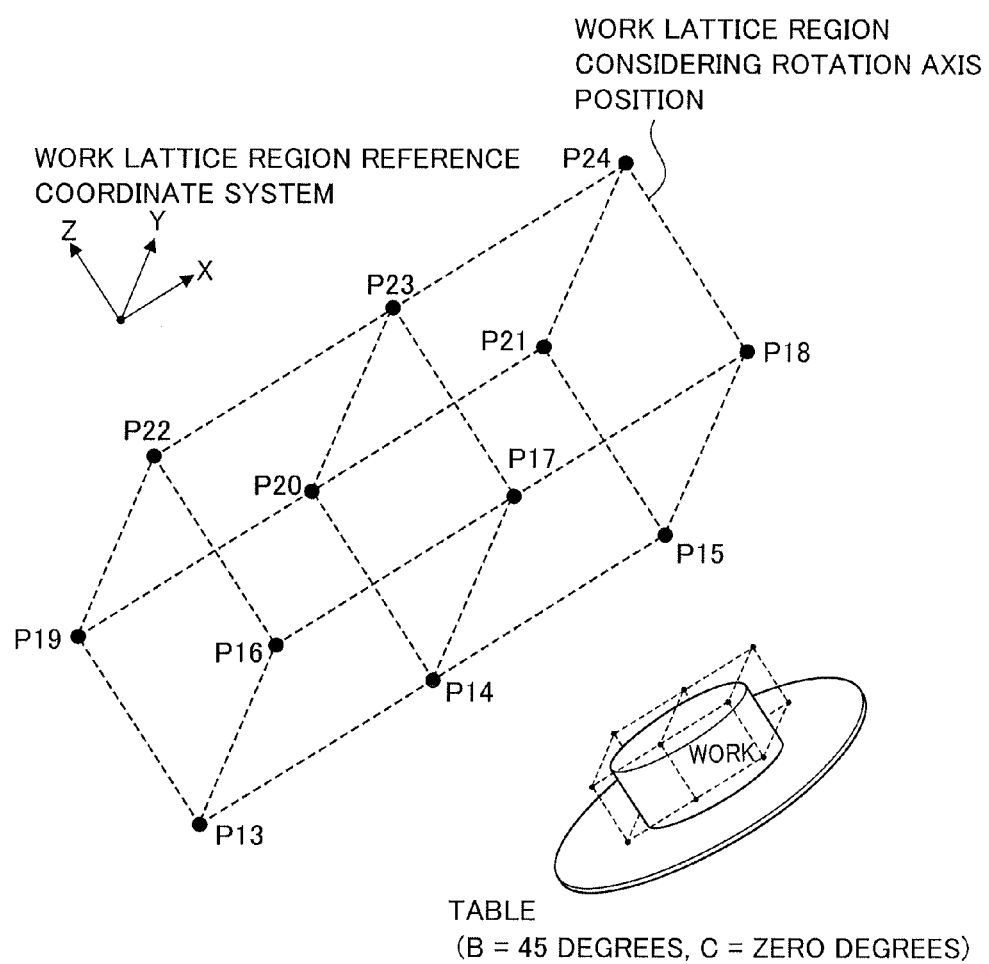
FIG. 6 is a view illustrating a state where the work lattice region is rotated with a change in a position of the rotation axis controlling the table.

FIG. 6 illustrates a state where the work lattice region is rotated with a change in a position of the rotation axis controlling the table. In a work lattice region reference system defined by three linear axes constituting the work, the work lattice region is divided as in the case of FIG. 5 considering an angle of the rotation axis. Thus, the work lattice region of FIG. 6 is a five-dimensional (X, Y, Z, B, C) corrected space constituted by two rotation axes and three linear axes of the work lattice region reference system.

The lattice points P1 to P12 in FIG. 5 and lattice points P13 to P24 in FIG. 6 are each an example corresponding to a given angle of the rotation axis, and lattice point numbers of the work lattice region are set as illustrated in a table of FIG. 7 at each of other angles. The above operations are performed by a rotation axis work lattice region setting unit 9.

Figure 8:
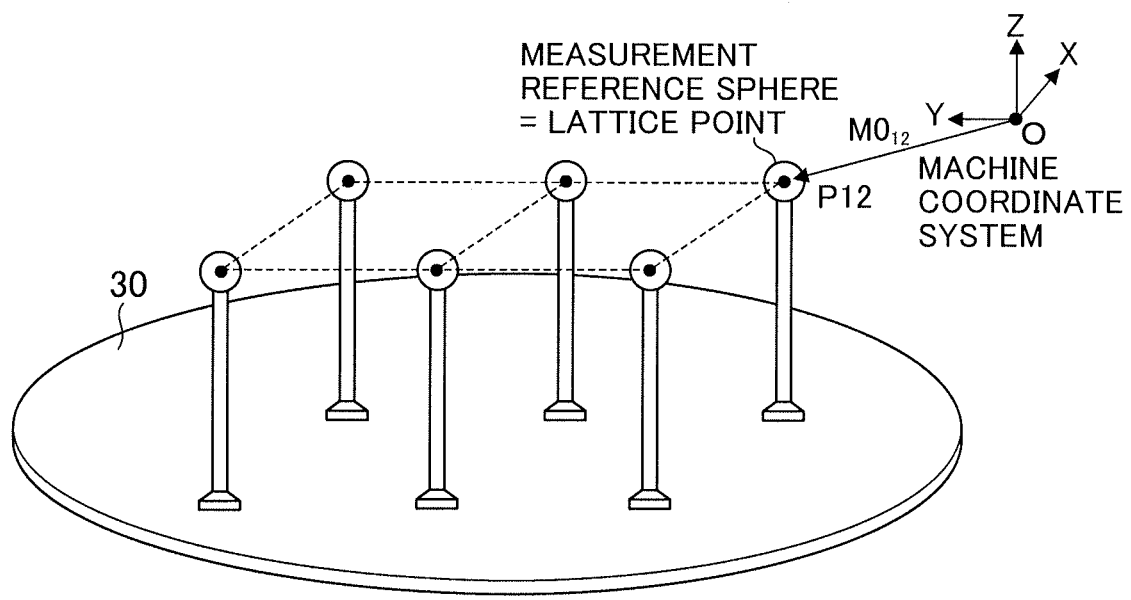
FIG. 8 is a view illustrating position data $Mo_{12}$ indicating a center of the reference sphere corresponding to the lattice point P12 of the work lattice region before installation of the work, the position data $Mo_{12}$ being measured using a measurement probe.
Figure 9:
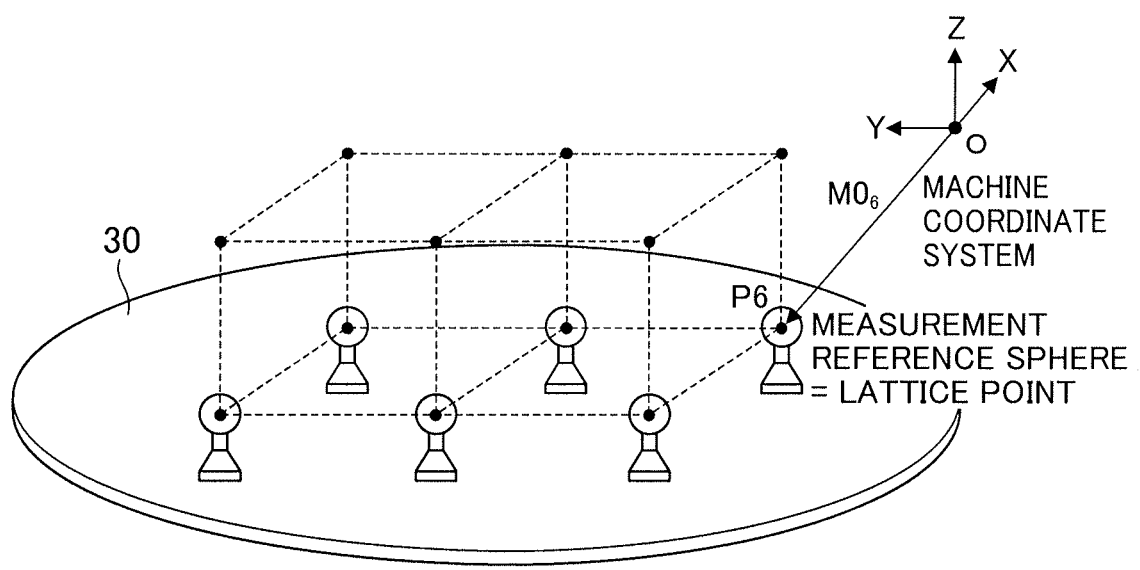
FIG. 9 is a view illustrating position data $Mo_6$ indicating the center of the reference sphere corresponding to the lattice point P6.

<4> Measurement Example of Work-Caused Translation Error and Setting of Correction Amount Table FIG. 8 illustrates position data $M0_{12}$ indicating a center of the reference sphere corresponding to the lattice point P12 of the work lattice region before installation of the work, the position data $M0_{12}$ being measured using a measurement probe. Similarly, FIG. 9 illustrates position data $M0_6$ corresponding to the lattice point P6 as in the case of FIG. 8.

Figure 10:
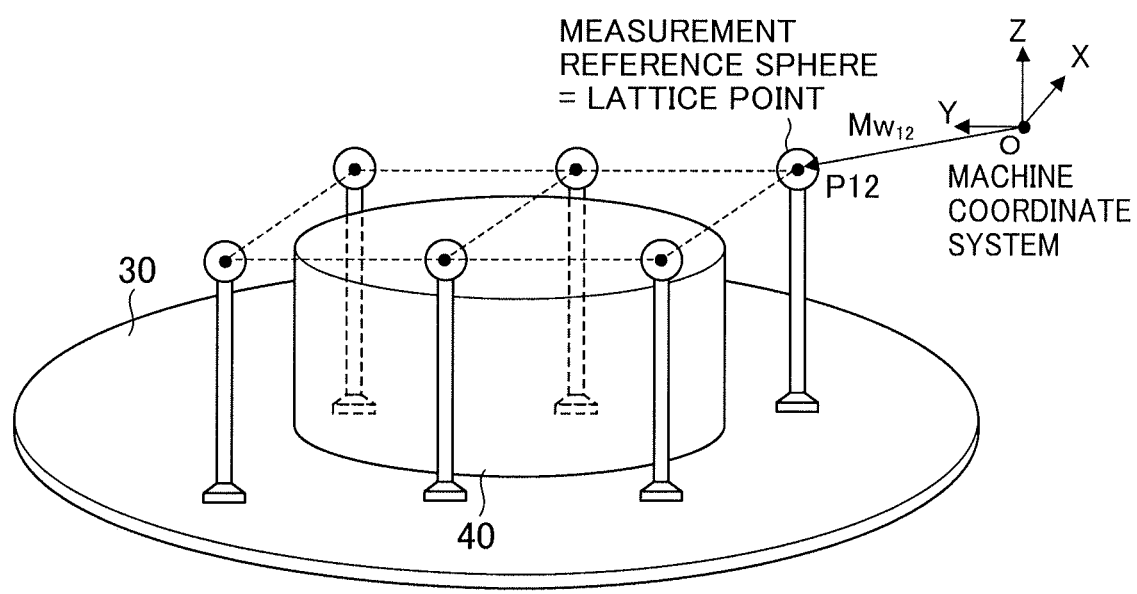
FIG. 10 is a view illustrating position data $Mw_{12}$ of the center of the reference sphere corresponding to the lattice point P12 of the work lattice region after installation of the work, the position data $Mw_{12}$ being measured using a measurement probe.

FIG. 10 illustrates position data $Mw_{12}$ of the center of the reference sphere corresponding to the lattice point P12 of the work lattice region after installation of the work, the position data $Mw_{12}$ being measured using a measurement probe. Similarly, FIG. 11 illustrates position data $Mw_6$ corresponding to the lattice point P6 as in the case of FIG. 10.

From the expression (1), $M0_{12}$ of FIG. 8, and $Mw_{12}$ of FIG. 10, the work-caused translation correction amount at the lattice point P12 is represented by the following expression (2):

$$\Delta Cw_{12} = \begin{bmatrix} \Delta Xw_{12}^x \\ \Delta Yw_{12}^y \\ \Delta Zw_{12}^z \end{bmatrix} = \begin{bmatrix} Mw_{12}^x - M0_{12}^x \\ Mw_{12}^y - M0_{12}^y \\ Mw_{12}^z - M0_{12}^z \end{bmatrix} \quad (2)$$

Figure 11:
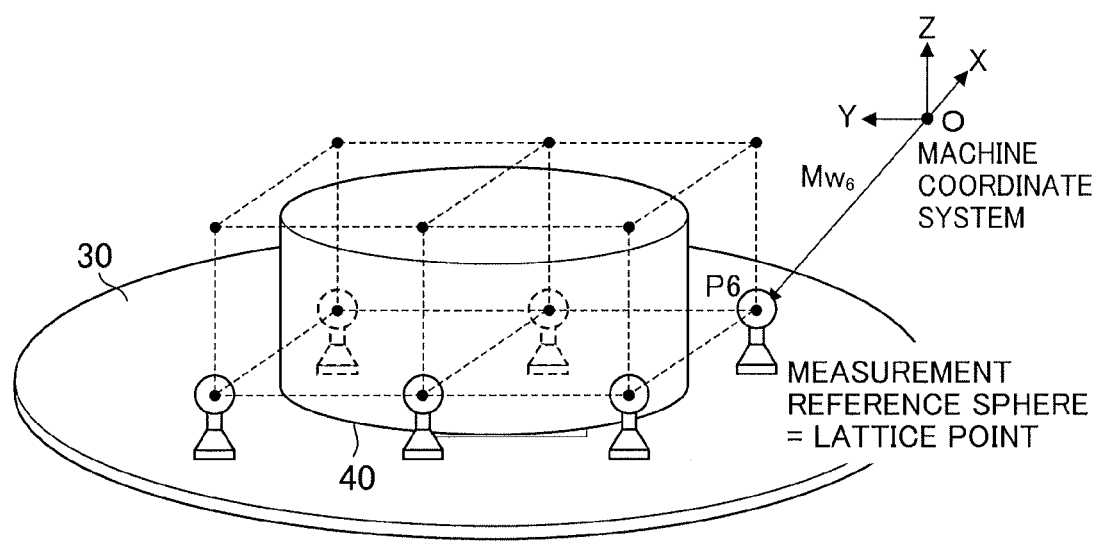
FIG. 11 is a view illustrating position data $Mw_6$ indicating the center of the reference sphere corresponding to the lattice point P6.

Similarly, $M0_6$ of FIG. 9, and $Mw_6$ of FIG. 11, the work-caused translation correction amount at the lattice point P6 is represented by the following expression (3):

$$\Delta Cw_6 = \begin{bmatrix} \Delta Xw_6^x \\ \Delta Yw_6^y \\ \Delta Zw_6^z \end{bmatrix} = \begin{bmatrix} Mw_6^x - M0_6^x \\ Mw_6^y - M0_6^y \\ Mw_6^z - M0_6^z \end{bmatrix} \quad (3)$$

Data of the measured work-caused translation correction amount $\Delta Cw$ is stored in a non-volatile memory or the like incorporated in the numerical controller in the form of a correction amount table illustrated in FIG. 12. The lattice point numbers indicate P1 to P12 of FIG. 5 and P13 to P24 of FIG. 6, each of which is the center of the measurement reference sphere. Then, rotation axis coordinates (B(n), C(n)) at the lattice point number Pn, linear axis coordinates (X(n), Y(n), Z(n)) in the work lattice region reference coordinate system, and measured work-caused translation correction amount $\Delta Cw$ ($\Delta Xw(n)$, $\Delta Yw(n)$, $\Delta Zw(n)$) are set. The above operations are performed by a work-caused translation correction amount setting unit 10.

Figure 13:
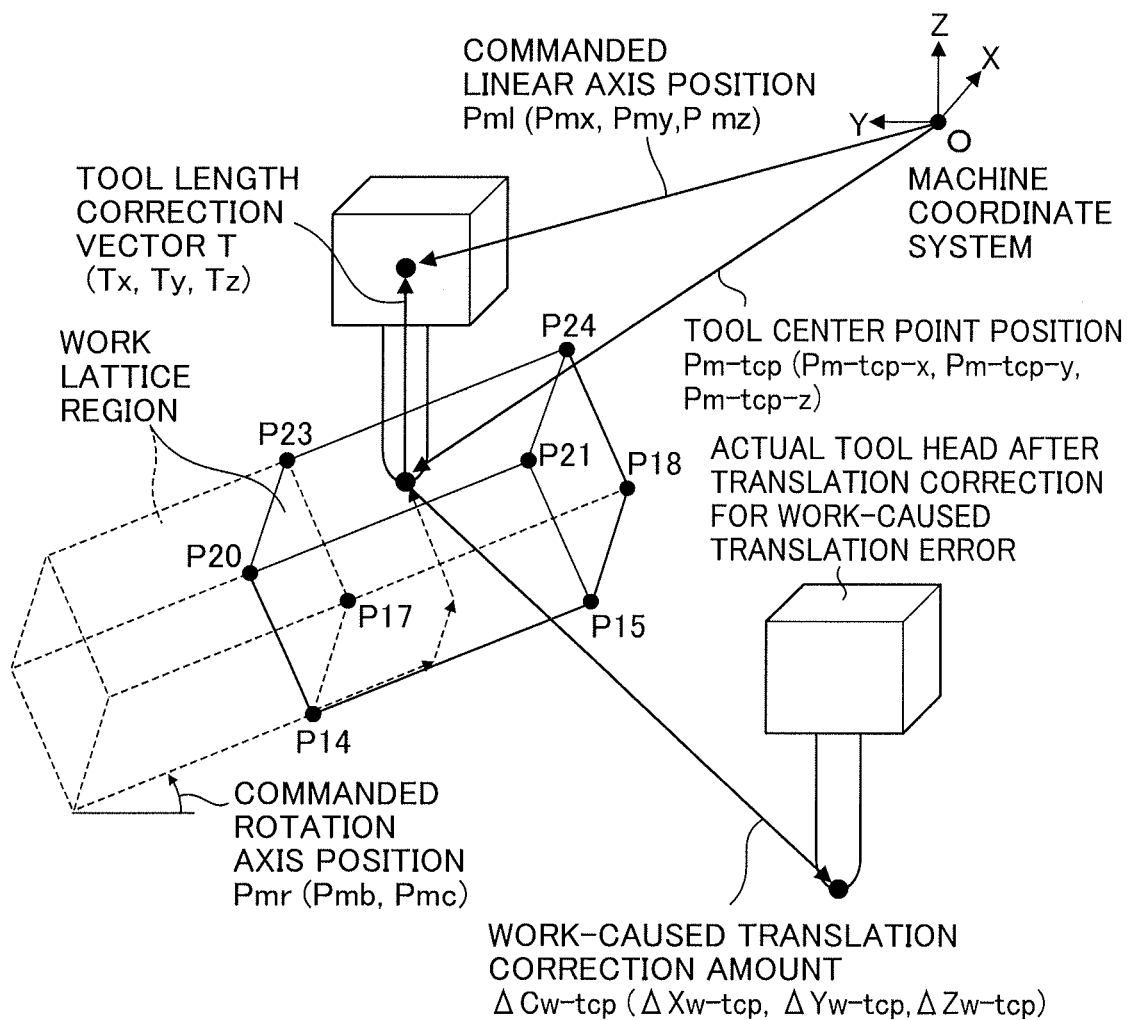
FIG. 13 is a view illustrating a state where a tool center point is positioned within the work lattice region including lattice points P14 to P24.

<5> Calculation of Work-Caused Translation Correction Amount at Tool Center Point Position FIG. 13 illustrates a state where the tool center point is positioned within the work lattice region including the lattice points P14 to P24. A tool center point position Pm-tcp (Pm-tcp-x, Pm-tcp-y, Pm-tcp-z) is a position represented by an expression (4) described below using the commanded linear axis position Pml (Pmx, Pmy, Pmz) and a tool length correction vector T (Tx, Ty, Tz).

A work-caused translation correction amount $\Delta Cw$-tcp ($\Delta Xw$-tcp, $\Delta Yw$-tcp, $\Delta Zw$-tcp) based on the tool center point position Pm-tcp is calculated by interpolation based on the work-caused translation correction amounts $\Delta Cw$ of neighboring lattice points (P14 to P24) in the correction amount table. The interpolation is a known technique, and detailed descriptions thereof are omitted here. Further, the work-caused translation correction amounts of the work installation surface/upper surface and an inside of the work that cannot be measured are calculated by interpolation based on error data of measurement points of the work side surface and that of their neighboring measurement points. The above operations are performed by a work-caused translation correction amount calculation unit 12.

$$P_{m\text{-}tcp} = \begin{bmatrix} P_{m\text{-}tcp}^x \\ P_{m\text{-}tcp}^y \\ P_{m\text{-}tcp}^z \end{bmatrix} = \begin{bmatrix} P_m^x - T^x \\ P_m^y - T^y \\ P_m^z - T^z \end{bmatrix} \quad (4)$$

<6> Block Diagram

Figure 14:
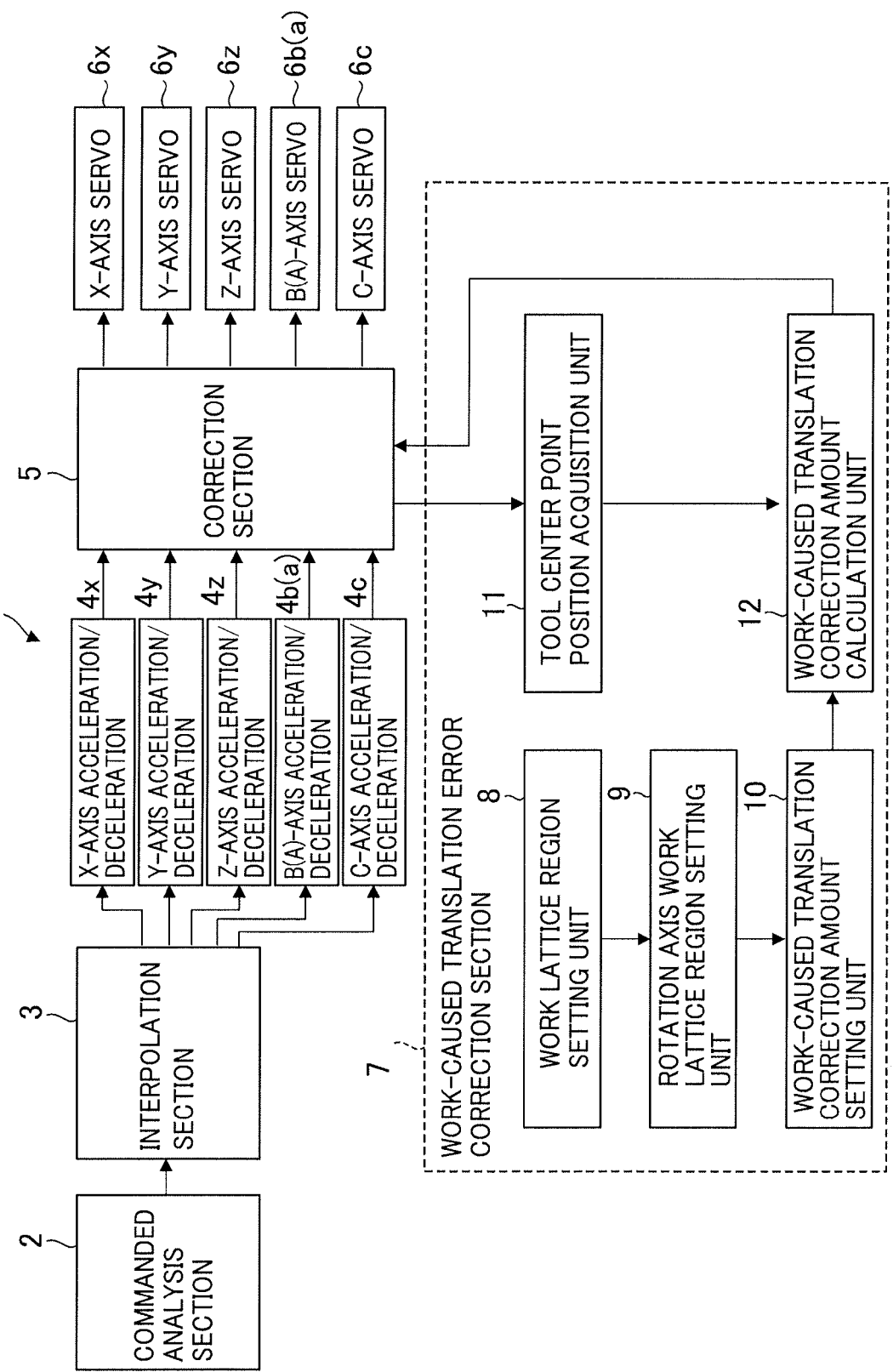
FIG. 14 is a view explaining a configuration of the numerical controller provided with an error correction section.

The following describes a configuration of the numerical controller according to the embodiment provided with an error correction section with reference to FIG. 14. Typically, a numerical controller 1 analyzes a program commanded in a commanded analysis section 2 to create interpolation data, performs interpolation based on the interpolation data in an interpolation section 3 to calculate destination positions of respective axes, calculates positions of respective axes after acceleration/deceleration performed by an X-axis acceleration/deceleration section 4x, a Y-axis acceleration/deceleration section 4y, a Z-axis acceleration/deceleration section 4z, a B (A)-axis acceleration/deceleration section 4b (a), and a C-axis acceleration/deceleration section 4c, applies conventional correction, such as pitch error correction or straightness error correction, to the machine-caused translation error in a correction section 5 (see JP 2009-151756 A), and drives an X-axis servo 6x, a Y-axis servo 6y, a Z-axis servo 6z, a B (A)-axis servo 6b (a), and a C-axis servo 6c based on finally calculated positions.

In a work-caused translation error correction section 7, lattice points for error correction are set by a work lattice region setting unit 8 and a rotation axis work lattice region setting unit 9, and correction data is set by a work-caused translation correction amount setting unit 10 based on the measured work-caused translation correction amount. The tool center point position is acquired by the correction section 5, and its corresponding work-caused translation correction amounts at the lattice points are acquired. The work-caused translation correction amount calculation unit 12 of the work-caused translation error correction section 7 uses the tool center point position and its corresponding work-caused translation correction amounts at the lattice points to convert the work-caused translation correction amounts at the lattice points into the correction amount ΔCw-tcp for the tool center point position. The acquired correction amount ΔCw-tcp is added as a new correction amount to the conventional correction amount.

<7> Flowchart Illustrating Algorithm

Figure 15:
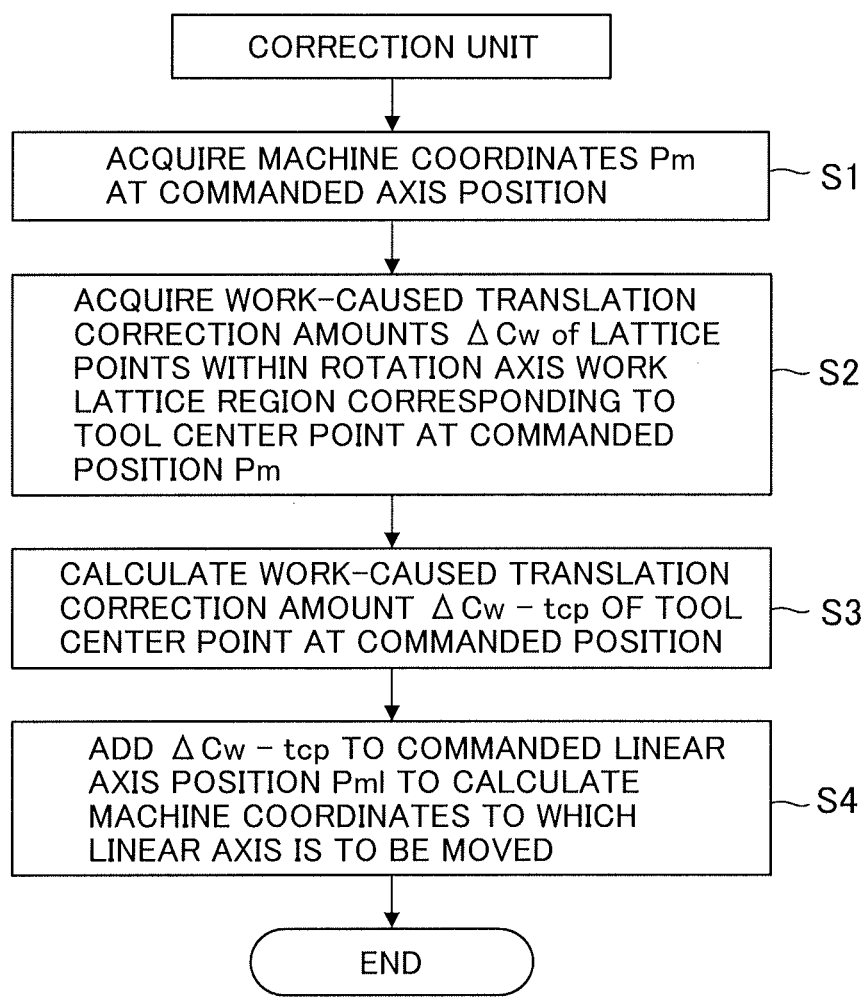
FIG. 15 is a flowchart illustrating an algorithm of correction to be executed in the first embodiment.

FIG. 15 is a flowchart illustrating an algorithm of correction to be executed in the first embodiment. Descriptions will be made in the order of steps.
[Step S1] Machine coordinates Pm (Pmx, Pmy, Pmz, Pmb, Pmc) at the commanded axis position are acquired.
[Step S2] The work-caused translation correction amounts ΔCw (ΔXw, ΔYw, ΔZw) at the lattice points within the rotation axis work lattice region corresponding to the tool center point at the commanded position Pm are acquired.
[Step S3] The work-caused translation correction amount ΔCw-tcp of the tool center point at the commanded position Pm is calculated.
[Step S4] The ΔCw-tcp is added to the commanded linear axis position Pml (Pmx, Pmy, Pmz) to calculate machine coordinates to which the linear axis is to be moved.

Second Embodiment

<1> Target Machine and Error Correction Vector

Figure 16:
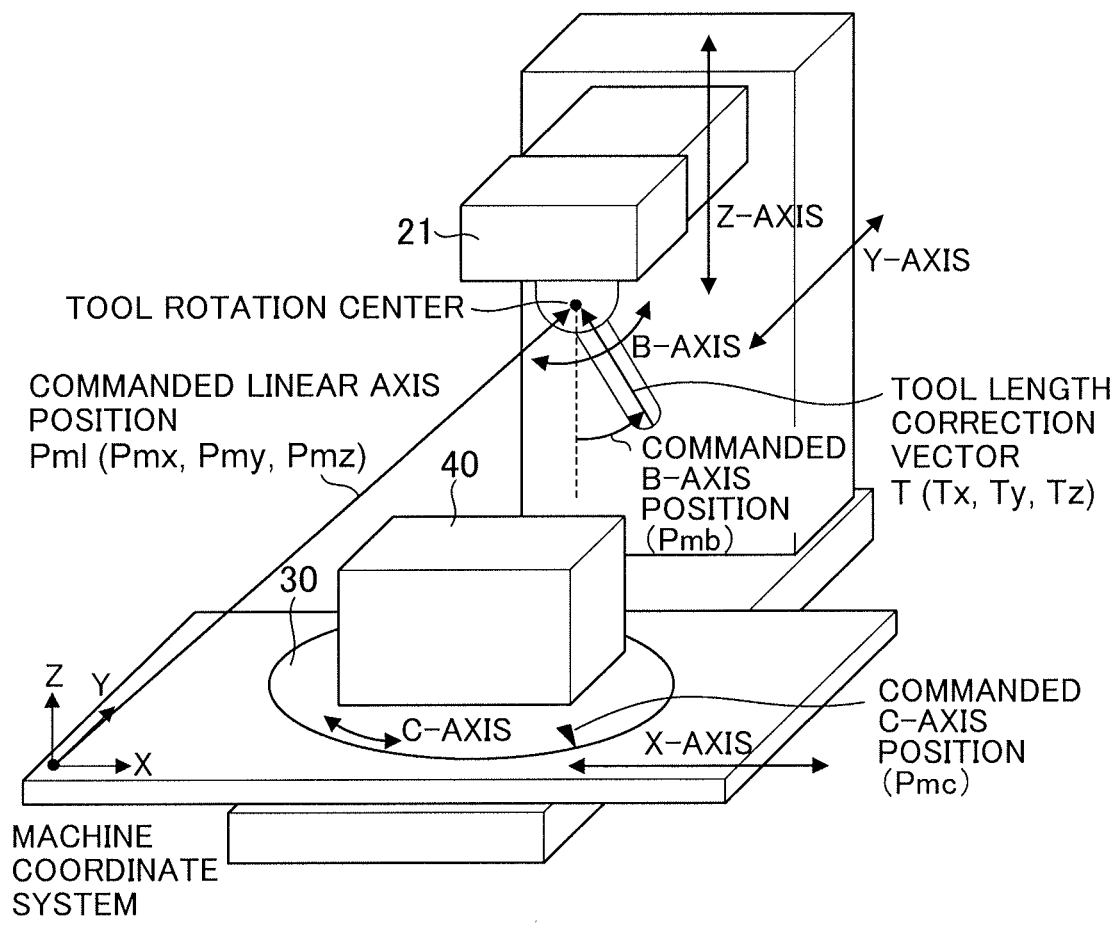
FIG. 16 is an embodiment of a mixed type five-axis machine tool operating under control of the numerical controller.

FIG. 16 is an embodiment of a mixed type five-axis machine tool operating under control of the numerical controller. In a mechanical configuration illustrated in FIG. 16, a tool head 21 tilting about a B-axis linearly moves in Y- and Z-axes, and the table 30 rotating about a C-axis linearly moves along an X-axis. The work 40 is placed on the table 30.

A translation error caused by the machine side, a translation error caused by the work side, and correction thereof in the mixed type five-axis machine tool will be described. FIG. 17 is a view illustrating a relationship between a tool and table in the absence of an error, a relationship between the tool and table in the presence of the machine-caused translation error, and a relationship between a work and table in the presence of the work-caused translation error which is caused due to installation of the work on the table. The contents of the "<1> target machine and error correction vector" are the same as those of the first embodiment, and descriptions thereof are omitted.

<2> Work-Caused Error

The contents of <2> are the same as those of the first embodiment, and descriptions thereof are omitted.

<3> Definition Method for Work Lattice Region

Although two rotation axes are set for rotating the work in the first embodiment, only one rotation axis is set in the second embodiment. Thus, the table of FIG. 7 may be made by considering only one rotation axis (C-axis), that is, configured as a four-dimensional table of linear axes (X-, Y-, Z-axes) and one rotation axis (C-axis). The rest is the same as the first embodiment, and therefore not explained here.

<4> Measurement Example of Work-Caused Translation Error and Setting of Correction Amount Table The contents thereof are the same as those of the first embodiment, and descriptions thereof are omitted.

<5> Calculation of Work-Caused Translation Correction Amount at Tool Center Point Position The contents of <5> are the same as those of the first embodiment, and descriptions thereof are omitted.

<6> Block Diagram

The contents of <6> are the same as those of the first embodiment, and descriptions thereof are omitted.

<7> Flowchart Illustrating Algorithm

The contents of <7> are the same as those of the first embodiment, and descriptions thereof are omitted.

The invention claimed is:
1. A numerical controller for controlling a five-axis machine tool that applies machining to a work to be machined placed on a table with three linear axes and two rotation axes, comprising:
a work lattice region setting unit that sets a work lattice region within a work neighboring region covering the work in a three-dimensional coordinate system fixed on the table, the work lattice region being divided in a lattice at lattice points arranged at predetermined intervals;
a rotation axis work lattice region setting unit that sets the work lattice region as a rotation axis work lattice region with rotation positions of the two rotation axes about which the table rotates;
a work-caused translation correction amount setting unit that sets correction amounts of a work-caused translation error at the lattice points caused before the work has been placed on the table and after the work has been placed on the table with respect to the lattice points of the rotation axis work lattice region; and a work-caused translation correction amount calculation unit that calculates, from the set correction amounts, a work-caused translation correction amount for a tool center point position on the work, wherein the numerical controller includes a function that corrects an error by adding the work-caused translation correction amount to positions of the three linear axes.

2. The numerical controller according to claim 1, wherein the five-axis machine tool is a rotary table type five-axis machine tool configured to rotate the table by the two rotation axes.

3. A numerical controller for controlling a mixed type five-axis machine tool that comprises three linear axes and two rotation axes where a tool head can rotate about one of the two rotation axes and a table can rotate about the other of the two rotation axes so that a work to be machined placed on the table can be machined, the numerical controller comprising:

a work lattice region setting unit that sets a work lattice region within a work neighboring region covering the work in a three-dimensional coordinate system fixed on the table, the work lattice region being divided in a lattice at lattice points arranged at predetermined intervals;

a rotation axis work lattice region setting unit that sets the work lattice region as a rotation axis work lattice region with rotation position of the two rotation axes about which the table rotates;

a work-caused translation correction amount setting unit that sets correction amounts of a work-caused translation error at the lattice points caused before the work has been placed on the table and after the work has been placed on the table with respect to the lattice points of the rotation axis work lattice region; and a work-caused translation correction amount calculation unit that calculates, from the set correction amounts, a work-caused translation correction amount for a tool center point position on the work, wherein the numerical controller includes a function that corrects an error by adding the work-caused translation correction amount to positions of the three linear axes.

* * * * *